(12) United States Patent
Mukherjee et al.

(10) Patent No.: US 12,439,253 B2
(45) Date of Patent: Oct. 7, 2025

(54) SINGLE DEVICE-LEVEL PASSCODE THAT PROVIDES AUTOMATED ACCESS TO MULTIPLE COMPUTING DEVICES AND PASSCODE-PROTECTED APPLICATIONS AND WEB SITES/SERVICES

(71) Applicant: BANK OF AMERICA CORPORATION, Charlotte, NC (US)

(72) Inventors: Maharaj Mukherjee, Poughkeepsie, NY (US); George Anthony Albero, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 114 days.

(21) Appl. No.: 18/402,149

(22) Filed: Jan. 2, 2024

(65) Prior Publication Data

US 2025/0220422 A1 Jul. 3, 2025

(51) Int. Cl.
*H04W 12/06* (2021.01)
*H04W 4/80* (2018.01)

(52) U.S. Cl.
CPC .......... *H04W 12/068* (2021.01); *H04W 4/80* (2018.02)

(58) Field of Classification Search
CPC .. G06F 21/41; G06F 21/35; G06F 2221/2111; G06F 21/32; G06F 21/34; G06F 21/316; G06F 21/629; G06F 21/604; G06F 21/6209; H04L 63/0815; H04L 63/20; H04L 63/0838; H04L 63/0884; H04L 63/10; H04L 63/0853; H04L 63/083; H04L 2209/80; H04L 9/0825; H04L 9/3213; H04L 9/3226; H04L 63/08; H04L 2463/062; H04L 2463/082; H04L 63/0428; H04L 63/0492; H04L 63/0823; H04L 63/0876; H04L 63/107; H04L 63/18; H04L 67/55; H04W 12/63; H04W 12/069; H04W 12/08; H04W 12/50; H04W 12/72;
(Continued)

(56) References Cited

U.S. PATENT DOCUMENTS 5,944,824 A 8/1999 He
6,182,214 B1 1/2001 Hardjono
(Continued)

*Primary Examiner* — Chris Parry
*Assistant Examiner* — Abderrahmen Chouat
(74) *Attorney, Agent, or Firm* — Moore & Van Allen PLLC; Anup Iyer

(57) ABSTRACT

A single device-level passcode serves to unlock a passcode vault, such that, automated login/access to other computing devices, applications, networks and/or websites/web services, which have the user's passcodes stored in the vault, occurs. Specifically, in the case of other computing devices, short-range wireless communication between the initial logged-in computing device and another computing device triggers retrieval of the other computing devices passcode from the passcode vault and automated user log-in at other computing device. The passcode may be mapped to previously-captured user characteristics, such that multi-factored authentication including user characteristic verification may occur at the time the passcode vault is unlocked (i.e., when the single passcode is entered), continuously throughout the device session and/or when the passcode vault is accessed to retrieve a passcode for another device, network, application or web site/service.

19 Claims, 9 Drawing Sheets

(58) Field of Classification Search
CPC ..... H04W 12/64; H04W 12/77; H04W 12/06; H04W 12/03; H04W 12/068; H04W 12/33; H04W 4/02; H04W 4/021; H04W 4/023; H04W 4/14; H04W 4/80; H04W 76/10; H04W 76/14; H04W 84/18
See application file for complete search history.

(56) References Cited

U.S. PATENT DOCUMENTS

| | | | |
|---|---|---|---|
| 6,704,873 B1 | 3/2004 | Underwood | |
| 7,191,466 B1 | 3/2007 | Hamid et al. | |
| 7,366,720 B2 | 4/2008 | Deshpande | |
| 7,451,147 B1 | 11/2008 | Kao et al. | |
| 7,788,304 B2 | 8/2010 | Kotani | |
| 8,079,066 B1 | 12/2011 | Cordell et al. | |
| 8,127,345 B2 | 2/2012 | Gregg et al. | |
| 8,150,728 B1 | 4/2012 | Bayer et al. | |
| 8,285,681 B2 | 10/2012 | Prahlad et al. | |
| 8,296,570 B2 | 10/2012 | Hamid et al. | |
| 8,312,270 B1 | 11/2012 | Chou et al. | |
| 8,544,058 B2 | 9/2013 | Lim | |
| 8,707,409 B2 | 4/2014 | Shah et al. | |
| 8,813,203 B2 | 8/2014 | Anderson | |
| 8,819,768 B1 | 8/2014 | Koeten et al. | |
| 8,856,176 B1 | 10/2014 | Venu et al. | |
| 9,081,973 B2 | 7/2015 | Newman et al. | |
| 9,330,245 B2 | 5/2016 | Maron | |
| 9,531,714 B2 | 12/2016 | Innes et al. | |
| 9,544,314 B2 | 1/2017 | Gregg et al. | |
| 10,146,931 B1 | 12/2018 | Kronrod et al. | |
| 10,657,242 B1* | 5/2020 | Xia | H04L 9/0825 |
| 10,805,284 B2 | 10/2020 | Magyar et al. | |
| 11,943,215 B1* | 3/2024 | Nair | H04L 9/3226 |
| 2022/0292179 A1* | 9/2022 | Fisher-Stawinski | G06F 3/04886 |
| 2022/0391490 A1* | 12/2022 | Maresh | H04L 63/083 |

* cited by examiner

SINGLE DEVICE-LEVEL PASSCODE THAT PROVIDES AUTOMATED ACCESS TO MULTIPLE COMPUTING DEVICES AND PASSCODE-PROTECTED APPLICATIONS AND WEB SITES/SERVICES

FIELD OF THE INVENTION

The present invention is related generally to computer security and, more specifically, a computing login management system that provides for a single device-level passcode to unlock a passcode vault, such that, automated login/access to other devices, applications, networks and/or websites/web services occurs.

BACKGROUND

Historically, computer security has been addressed through implementation of user authentication in the form of login procedures, in which the user inputs credentials, such as username and/or passcode that are then verified as matching previously stored credentials. Such login procedures may be the sole form of user authentication or may be part of a multi-factor authentication process in which the user is required to provide other verification factors, in addition to their passcode, for purposes of authentication.

Login procedures are not only required at the device level but may also be required to gain access to networks (e.g., intranet within an enterprise or the like), applications, websites, web services or the like. To be able to gain access to all of their requisite computing needs, users are required to possess multiple, if not hundreds of, different passcodes. As a result, trying to recall the passcodes and which passcodes are applicable to which devices, networks, applications, websites and the like becomes a daunting, if not impossible, task.

In addition, each device, network, application, website or the like have their own passcode rules which define the requirements of the passcode (e.g., minimum number of characters, case requirements, special character requirements and the like) as well as the life of the passcode (e.g., expiration period/date or the like). Typically, a user only becomes aware that a passcode has expired when a user attempts to login to the device, network, application, website or the like. Such notification of an expired passcode prompts the user to create a new passcode. In many instances, due to the user's unfamiliarity with the passcode rules, a user may have to make numerous attempts to create a new passcode in order to satisfy all of the passcode requirements. This can be an exasperating experience for the user, which only adds to delay in the user being able to access the device, network, application, website or the like.

Therefore, a need exists to develop systems, computerized methods, computer program products and the like that will address these needs. Specifically, desired systems and the like should lessen, if not eliminate, the need for a user to recall the numerous passcodes they possess in order to gain access to all of their computing needs. Moreover, in specific instances the desired systems and the like should provide for logins to occur transparently (i.e., absent user input and/or user knowledge). In addition, the desired systems and the like should provide for such logins to occur as part of a multi-factor authentication process, in which the other verification factors also occur transparent to the user and, in some instances, continuously throughout a login session.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like that provide for a single device-level passcode that is configured, upon verification, to unlock a passcode vault, such that, automated login/access to other computing devices, applications and/or websites/web services, which have the user's passcodes stored in the vault, occurs. In this regard, the user possesses a single passcode which provides access to a computing device (e.g., typically the first computing device that user will interface with during their day, such as, their mobile device/smart telephone). Entry of the single device-level passcode unlocks a passcode vault that stores most, if not all, of the user's passcodes mapped to their respective device, application, network, web site/service or the like. The unlocking of the passcode vault means that as the user accesses another device, a network, web site/service or launches an application having a passcode stored in the unlocked passcode vault, the passcode will automatically be communicated to and/or inputted into the requisite entry field without user input and, in certain instances, without user knowledge. As a result, the user can gain seamless access to most, if not all, of their requisite computing needs without having to be burdened with performing a login process and/or recalling the login credentials required to access desired devices, networks, applications, web sites/services or the like.

Specifically, automated login access to other computing devices is made possible by short-range wireless communication (e.g., Near Field Communication (NFC), BLUETOOTH® or the like) between the computing devices. For example, once the single passcode has been inputted and verified at the first computing device equipped with a short-range wireless mechanism (e.g., the user's mobile device/smart device) to unlock the passcode vault, the first computing device may be brought into close proximity of another computing device equipped with a similar short-range wireless mechanism (e.g., the user's Personal Computer (PC) or the like). As a result of the initial short-range wireless communication between the two computing devices (i.e., the initial handshake process between the two computing devices occurs), the other computing device may be awoken, the passcode vault may be accessed to retrieve the passcode associated with the other computing device, the passcode communicated to the other computing device and entered at the other computing device to allow the user to access the other computing device absent user input and/or user knowledge of the login process.

In further specific embodiments of the invention, the single device-level passcode is mapped to one and, typically multiple, user characteristics, which have previously been verified. User characteristics may include, but are not limited to, body characteristics, such as facial image, eye prints, fingerprints or the like, functional characteristics, such as input/typing rate/speed, cadence, error patterns or the like. In specific embodiments of the invention each character or segment of the passcode is mapped to a different user characteristic. As part of a multifactor authentication, the user characteristics are acquired and verified simultaneously with the user's entry and verification of the single passcode as a means of authenticating the user (i.e., providing device access and unlocking the passcode vault). In other instances, the user characteristics are acquired and verified continuously throughout the user's device session as a means for continuous multi-factor authentication (i.e., the passcode vault remains unlocked as long as the user characteristics are verified). In still further embodiments of the invention, the user characteristics are acquired and verified each time a user initiates access of another computing device, network, web site/service or launches an application in which associated passcodes are stored and retrieved from the passcode vault. It should be noted that in all instances, the user may be unaware of which user characteristics are mapped to the passcode and, thus, unaware that user characteristics are being acquired or otherwise identified.

A system for computing login management defines first embodiments of the invention. The system includes a first computing apparatus having a first memory, one or more first computing processor devices in communication with the first memory and a first short-range wireless communication mechanism executable by at least one of the one or more first computing processor devices. First memory stores a first passcode vault that stores a plurality of first passcodes. Each of the plurality of first passcodes is associated with (i) a computing apparatus, (ii) an application or (iii) a web site or web service. Additionally, first memory stores a computing login management application that is executable by at least one of the first computing processor device(s). Computing login management application is configured to receive a user input that defines an apparatus login passcode, verify that the user input matches a predefined apparatus login passcode, and in response to verifying that the user input matches the predefined apparatus login passcode, unlock the first computing apparatus and the first passcode vault. Unlocking the first computing apparatus and the first passcode vault provides for automatically (i) retrieving a corresponding one of the plurality of first passcodes from the first passcode vault when the user requests access to, via the first computing apparatus, an application, website or web service, and (ii) inputting the corresponding first passcode at the application, website or webservice to grant the user access to the application, website or webservice absent further user input.

The system additionally includes a second computing apparatus having a second memory, one or more second computing processor devices in communication with the second memory, and a second short-range wireless communication mechanism executable by at least one of the one or more second computing processor devices. In response to the first and second short-range wireless communication mechanisms engaging in short-range wireless communication, the computing login management application is further configured to automatically (i) retrieve a passcode associated with the second computing apparatus from amongst the plurality of first passcodes stored in the first passcode vault, (ii) communicate the passcode associated with the second computing apparatus to the second computing apparatus and (iii) input, at the second computing apparatus, the passcode associated with the second computing apparatus to, upon passcode verification, unlock the second computing apparatus absent user input.

In additional embodiments of the system, in response to the first and second short-range wireless communication mechanisms engaging in the short-range wireless communication, the computing login management application is further configured to automatically (i) retrieve a corresponding one of the plurality of first passcodes from the first passcode vault when the user requests access to, via the second computing apparatus, an application, website or web service, (ii) communicate the corresponding first passcode associated with application, website or web service to the second computing apparatus and (iii) input the corresponding first passcode at the application, website or webservice to grant the user access, on the second computing apparatus, to the corresponding application, website or webservice absent user input.

In further embodiments of the system, the computing login management application is further configured to map the device logon passcode to one or more first user characteristics previously captured or identified and store the mapping within the first memory. In response to verifying that the user input matches the predefined apparatus login passcode, the computing login management application is further configured to capture or identify current user characteristics, verify that the current user characteristics match the first user characteristics, and, in further response to verifying that the current user characteristics match the first user characteristics, unlock the first computing apparatus and the first passcode vault. In related embodiments of the system, the computing login management application is further configured to map each character or segment of the device to a corresponding one of a plurality of first user characteristics previously captured or identified. In further related embodiments of the system, the computing login management application is further configured to, in response to occurrence of a predetermined event (e.g., security breach or the like), re-map the device logon passcode to one or more second user characteristics previously captured or identified, which are different than at least one of the first user characteristics. In further related embodiments of the system, the computing login management application is further configured to, in response to unlocking the first computing apparatus and the first passcode vault, continuously capture or identify current user characteristics, verify that the current user characteristics match the first user characteristics, and in response to verifying that the current user characteristics match the first user characteristic, maintain the first passcode vault in an unlocked state. In still further related embodiments of the system, the computing login management application is further configured to, in response to the first and second short-range wireless communication mechanisms engaging in short-range wireless communication, capture or identify current user characteristics, verify that the current user characteristics match the first user characteristics, and in response to verifying that the current user characteristics match the first user characteristics and inputting the passcode associated with the second computing apparatus, unlock the second computing apparatus absent user input.

In other specific embodiments of the system, the second memory of the second computing apparatus stores a second passcode vault which stores a plurality of second passcodes. Each of the plurality of second passcodes is associated with (i) a computing apparatus, (ii) an application or (iii) a web site or web service. In such embodiments of the system, the computing login management application is further configured to, in response to the first and second short-range wireless communication mechanisms engaging in short-range wireless communication, synchronize the first passcode vault with the second passcode vault. Synchronization allows for the first and second passcodes stored in the first and second passcode vaults to be retrieved and inputted at applications, websites or web services on either the first or second computing apparatus.

A computer-implemented method for computing login management defines second embodiments of the invention. The method being executable by one or more computing processor devices. The method includes receiving, at a first computing device, a user input that defines an apparatus login passcode, verifying that the user input matches a predefined apparatus login passcode, and in response to verifying that the user input matches the predefined apparatus login passcode, unlocking a first passcode vault stored on or accessible to the first computing device. The first passcode vault stores a plurality of first passcodes, each of the plurality of first passcodes is associated with (i) a computing apparatus, (ii) an application, or (iii) a web site or web service. Unlocking the first computing apparatus and the first passcode vault provides for automatically (i) retrieving a corresponding one of the plurality of first passcodes from the first passcode vault when the user requests access to, via the first computing apparatus, an application, website or web service, and (ii) inputting the corresponding passcode at the application, website or webservice to grant the user access to the application, website or webservice absent user input. The method further includes, in response to a first short-range wireless communication mechanism embodied in the first computing device engaging in short-range wireless communication with a second wireless communication mechanism embodied in a second computing device, automatically (i) retrieving, from the first passcode vault, a passcode from amongst the plurality of first passcodes that is associated with the second computing device, (ii) communicating the passcode associated with the second computing apparatus to the second computing apparatus, and (iii) inputting, at the second computing apparatus, the passcode associated with the second computing apparatus to unlock the second computing apparatus absent user input.

In specific embodiments of the computer-implemented method, the method further includes, in response to the first short-range wireless communication mechanism engaging in short-range wireless communication with the second wireless communication mechanism, automatically (i) retrieving a corresponding one of the plurality of first passcodes from the first passcode vault when the user requests access to, via the second computing device, an application, website or web service, (ii) communicating the corresponding first passcode associated with the application, website or web service to the second computing device, and (iii) inputting the corresponding first passcode at the application, website or webservice to grant the user access, on the second computing apparatus, to the application, website or webservice absent user input.

In other specific embodiments of computer-implemented method, the method includes mapping each character or segment of the device logon passcode to a corresponding one of a plurality of first user characteristics that have been previously captured or identified. In such embodiments the method further includes, in response to verifying that the user input matches the predefined apparatus login passcode, capturing or identifying, at the first computing device, current user characteristics, verifying that the current user characteristics match the first user characteristics; and, in further response to verifying that the current user characteristics match the first user characteristics, unlocking the first computing apparatus and the first passcode vault. In related embodiments the method further includes, in response to unlocking the first computing apparatus and the first passcode vault, continuously capturing or identifying current user characteristics, verifying that the continuously captured or identified current user characteristics match the first user characteristics, and in response to verifying that the continuously captured or identified current user characteristics match the first user characteristic, maintaining the first passcode vault in an unlocked state. In still further related embodiments, the method includes, in response to the first short-range wireless communication mechanism engaging in short-range wireless communication with the second wireless communication mechanism, capturing or identifying, at the first computing device, current user characteristics, verifying that the current user characteristics match the first user characteristics, and in response to verifying that the current user characteristics match the first user characteristics and inputting the passcode associated with the second computing apparatus, unlocking the second computing apparatus absent user input.

In still further specific embodiments, the method includes, in response to the first short-range wireless communication mechanism engaging in short-range wireless communication with the second wireless communication mechanism, synchronizing the first passcode vault with a second passcode vault stored on or accessible to the second computing device. The second passcode vault stores a plurality of second passcodes, each of the plurality of second passcodes associated with (i) a computing apparatus, (ii) an application or (iii) a web site or web service. Synchronization allows for the first and second passcodes stored in the first and second passcode vaults to be retrieved and inputted at applications, websites or web services on either the first or second computing apparatus.

A computer program product including a non-transitory computer-readable medium defines third embodiments of the invention. The computer-readable medium includes sets of codes for causing one or more computing devices to receive, at a first computing device, a user input that defines an apparatus login passcode, verify that the user input matches a predefined apparatus login passcode, and in response to verifying that the input matches the predefined apparatus login passcode, unlock a first passcode vault stored on or accessible to the first computing device. The first passcode vault stores a plurality of first passcodes, each of the plurality of first passcodes associated with (i) a computing apparatus, (ii) an application or (iii) a web site or web service. Unlocking the first computing apparatus and the first passcode vault provides for automatically (i) retrieving a corresponding one of the plurality of first passcodes from the first passcode vault when the user requests access to, via the first computing apparatus, an application, website or web service, and (ii) inputting the corresponding passcode at the application, website or webservice to grant the user access to the application, website or webservice absent user input. The sets of codes further cause the computing device(s) to, in response to a first short-range wireless communication mechanism embodied in the first computing device engaging in short-range wireless communication with a second wireless communication mechanism embodied in a second computing device, automatically (i) retrieve, from the first passcode vault, a passcode from amongst the plurality of first passcodes that is associated with the second computing device, (ii) communicate the passcode associated with the second computing apparatus to the second computing apparatus, and (iii) input, at the second computing apparatus, the passcode associated with the second computing apparatus to unlock the second computing apparatus absent user input.

In specific embodiments of the computer program product, the sets of codes further cause the one or more computing devices to, in response to the first short-range wireless communication mechanism engaging in short-range wireless communication with the second wireless communication mechanism, automatically (i) retrieve a corresponding one of the plurality of first passcodes from the first passcode vault when the user requests access to, via the second computing device, an application, website or web service, (ii) communicate the corresponding first passcode associated with the application, website or web service to the second computing device, and (iii) input the corresponding first passcode at the application, website or webservice to grant the user access, on the second computing apparatus, to the application, website or webservice absent user input.

In other specific embodiments of the computer program product, the sets of codes further cause the one or more computing devices to map each character or segment of the device logon passcode to a corresponding one of a plurality of first user characteristics that have been previously captured or identified, and in response to verifying that the user input matches the predefined apparatus login passcode, (i) capture or identify, at the first computing device, current user characteristics, (ii) verify that the current user characteristics match the first user characteristics, and, in further response to verifying that the current user characteristics match the first user characteristics, (iii) unlock the first computing apparatus and the first passcode vault. In related embodiments of the computer program product, the sets of codes further cause the one or more computing devices to, in response to unlocking the first computing apparatus and the first passcode vault, continuously capture or identify current user characteristics, verify that the continuously captured or identified current user characteristics match the first user characteristics, and, in response to verifying that the continuously captured or identified current user characteristics match the first user characteristic, maintain the first passcode vault in an unlocked state. In other related embodiments of the computer program product, the sets of codes further cause the one or more computing devices to, in response to the first short-range wireless communication mechanism engaging in short-range wireless communication with the second wireless communication mechanism, capture or identify, at the first computing device, current user characteristics, verify that the current user characteristics match the first user characteristics, and in response to verifying that the current user characteristics match the first user characteristics and inputting the passcode associated with the second computing apparatus, unlock the second computing apparatus absent user input.

Thus, according to embodiments of the invention, which will be discussed in greater detail below, the present invention provides for a single device-level passcode which, upon verification, unlocks a passcode vault, such that, automated login/access to other computing devices, applications and/or websites/web services, which have the user's passcodes stored in the vault, occurs. Specifically, in the case of other computing devices, short-range wireless communication between the initial logged-in computing device and another computing device triggers retrieval of the other computing devices passcode from the passcode vault and automated user log-in at other computing device. In specific embodiments of the invention, the passcode is mapped to previously-captured user characteristics, such that multi-factored authentication including user characteristic verification occurs at the time the passcode vault is unlocked (i.e., when the single passcode is entered), continuously throughout the device session and/or when the passcode vault is accessed to retrieve a passcode for another device, network, application or web site/service.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
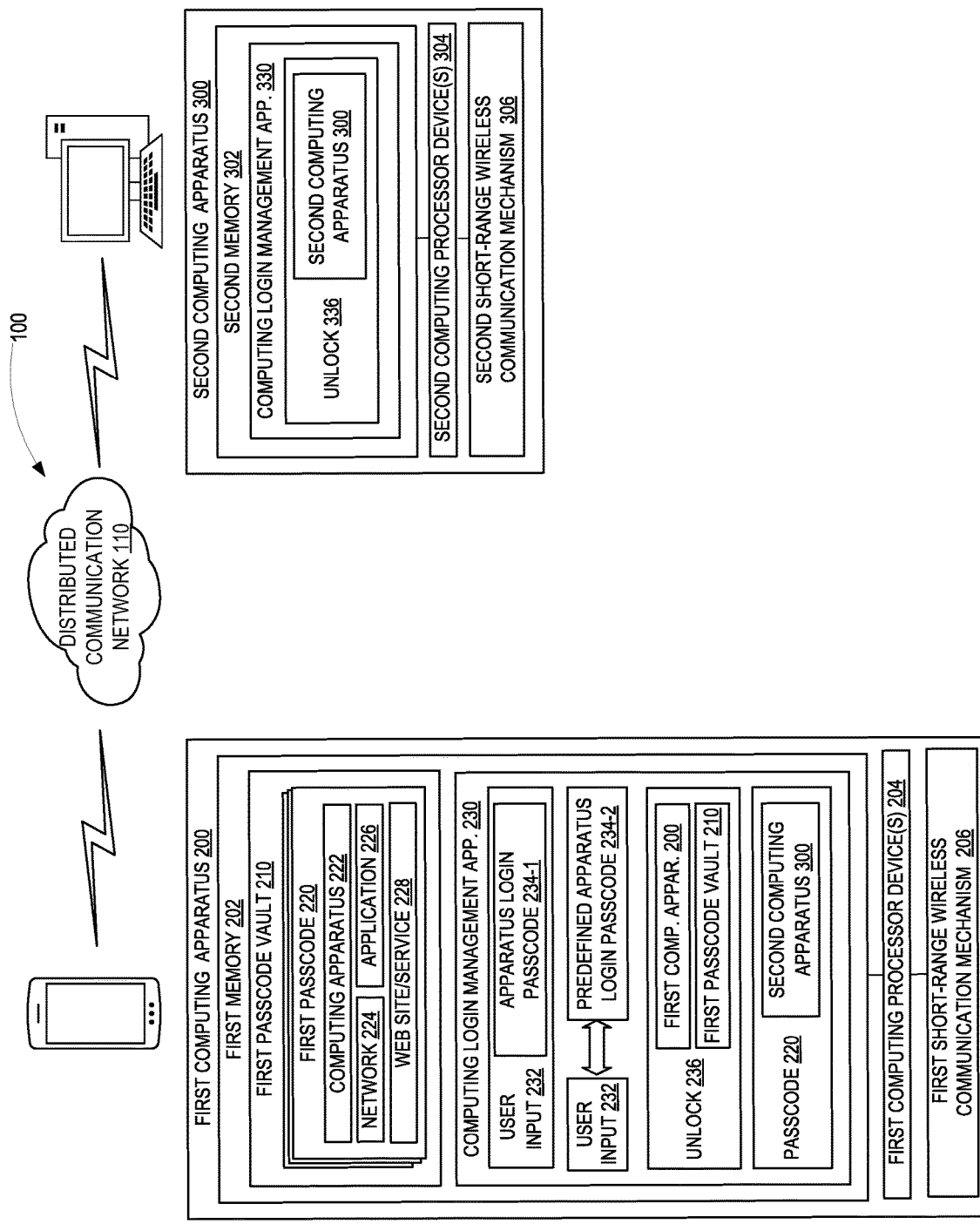
Figure 2:
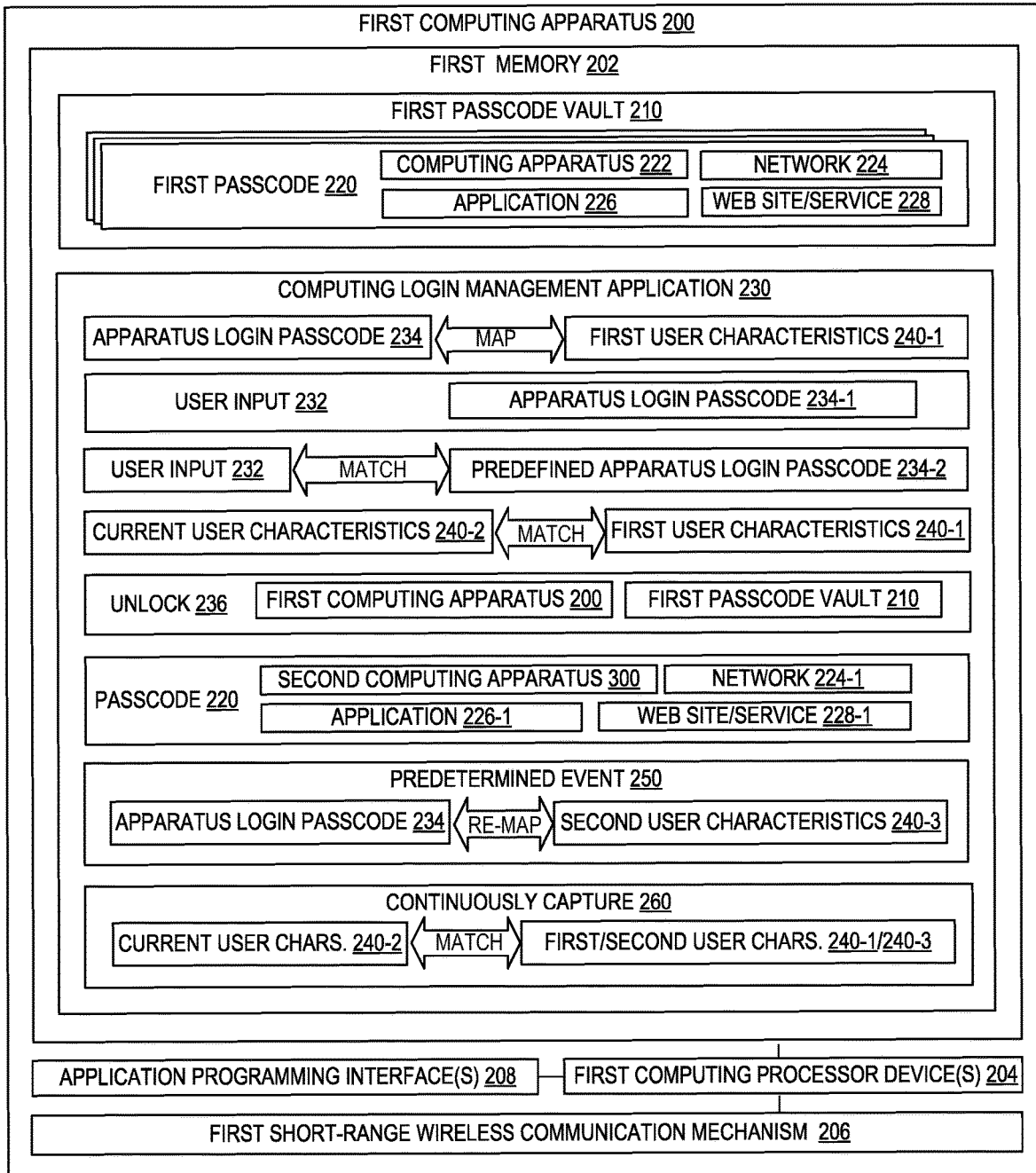
Figure 3:
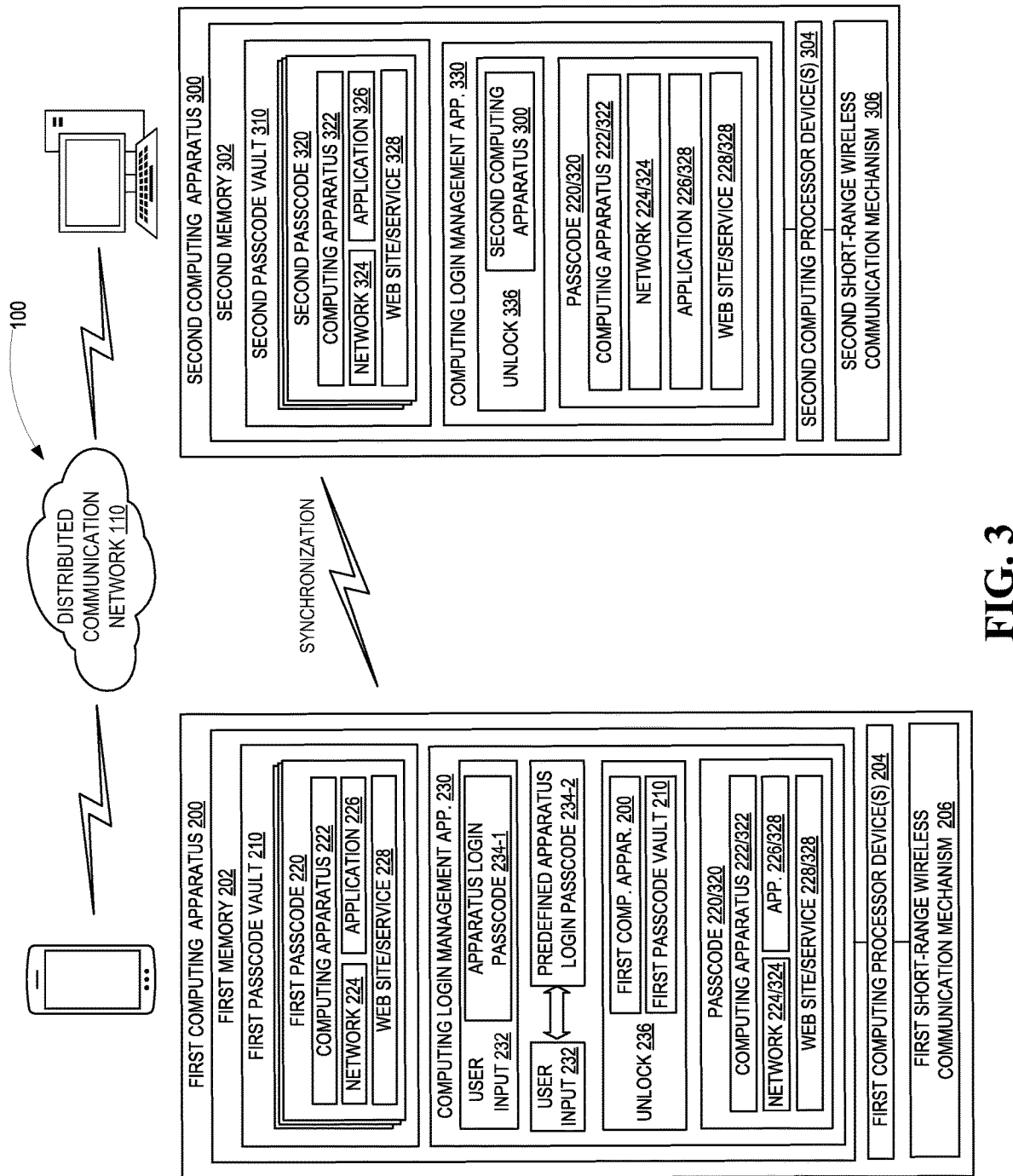
Figure 4:
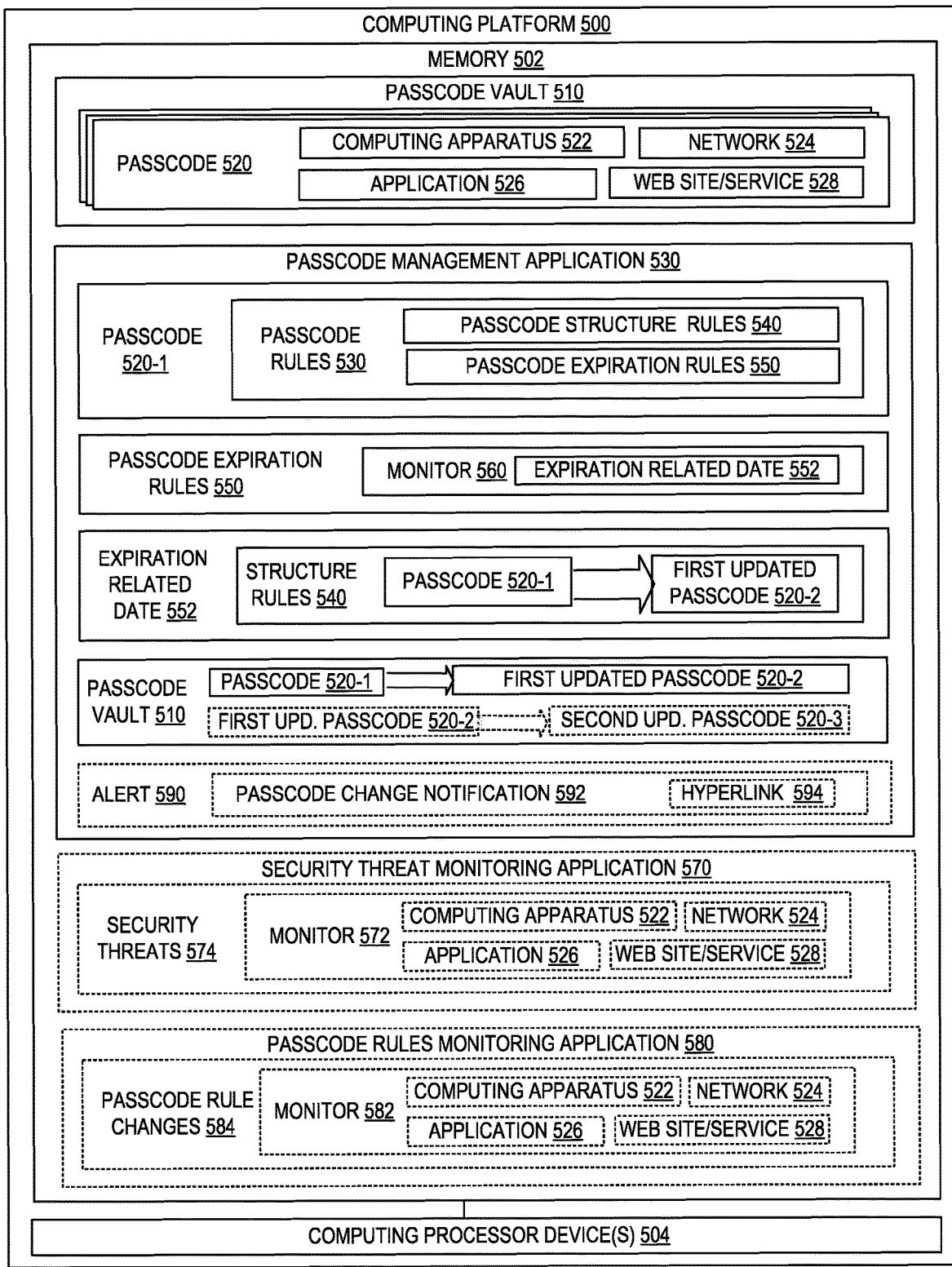
Figure 5:
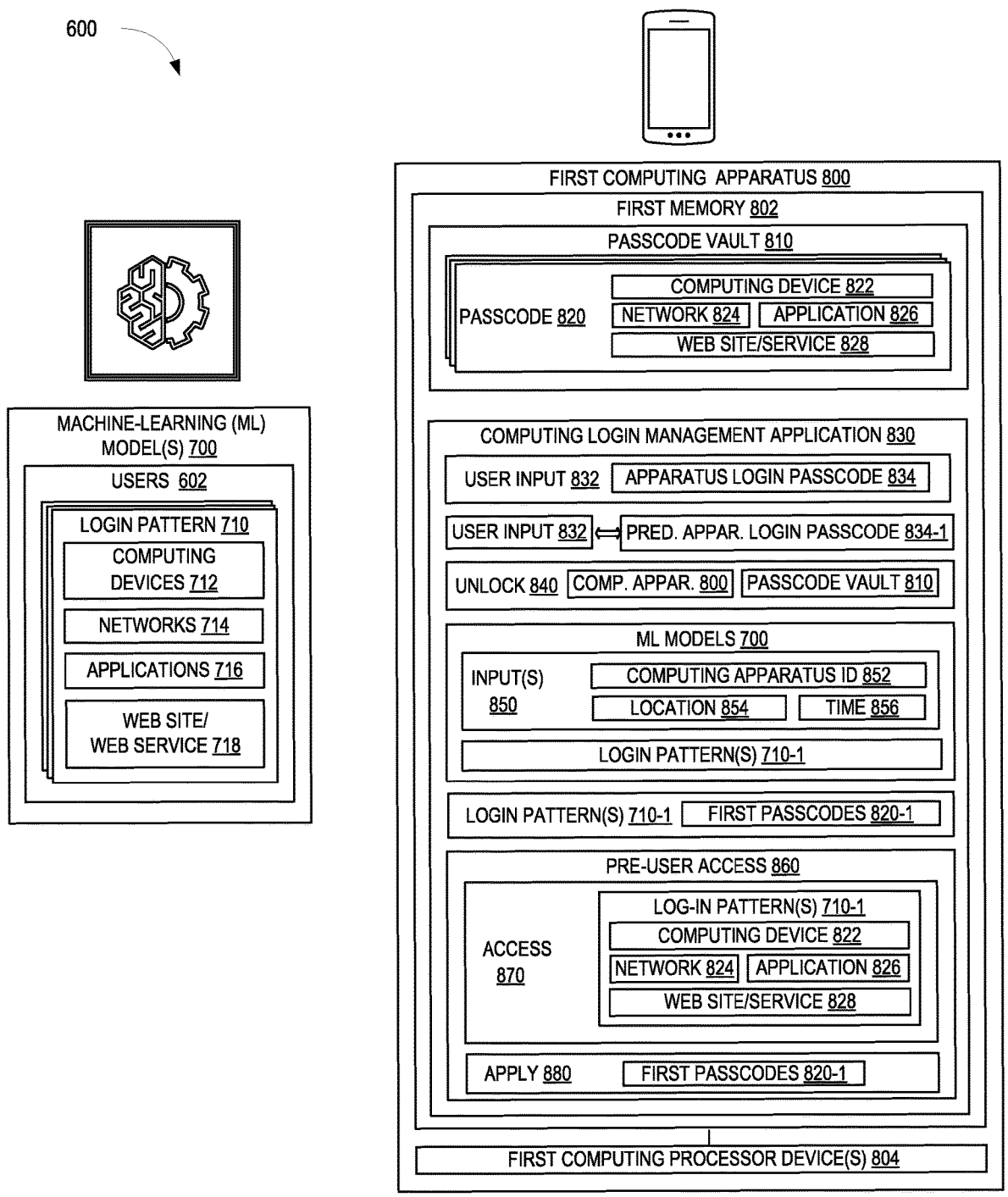
Figure 6:
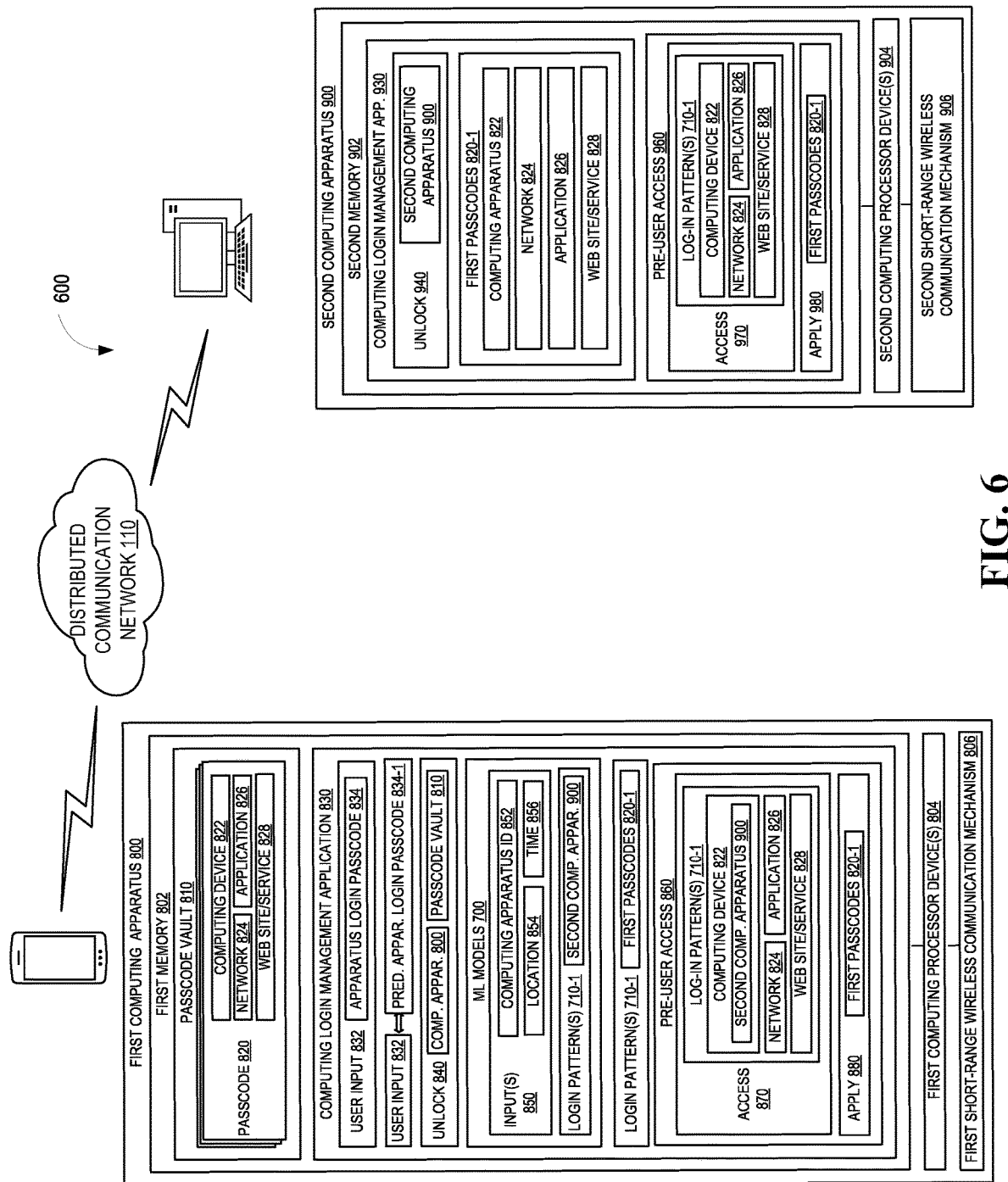
Figure 7:
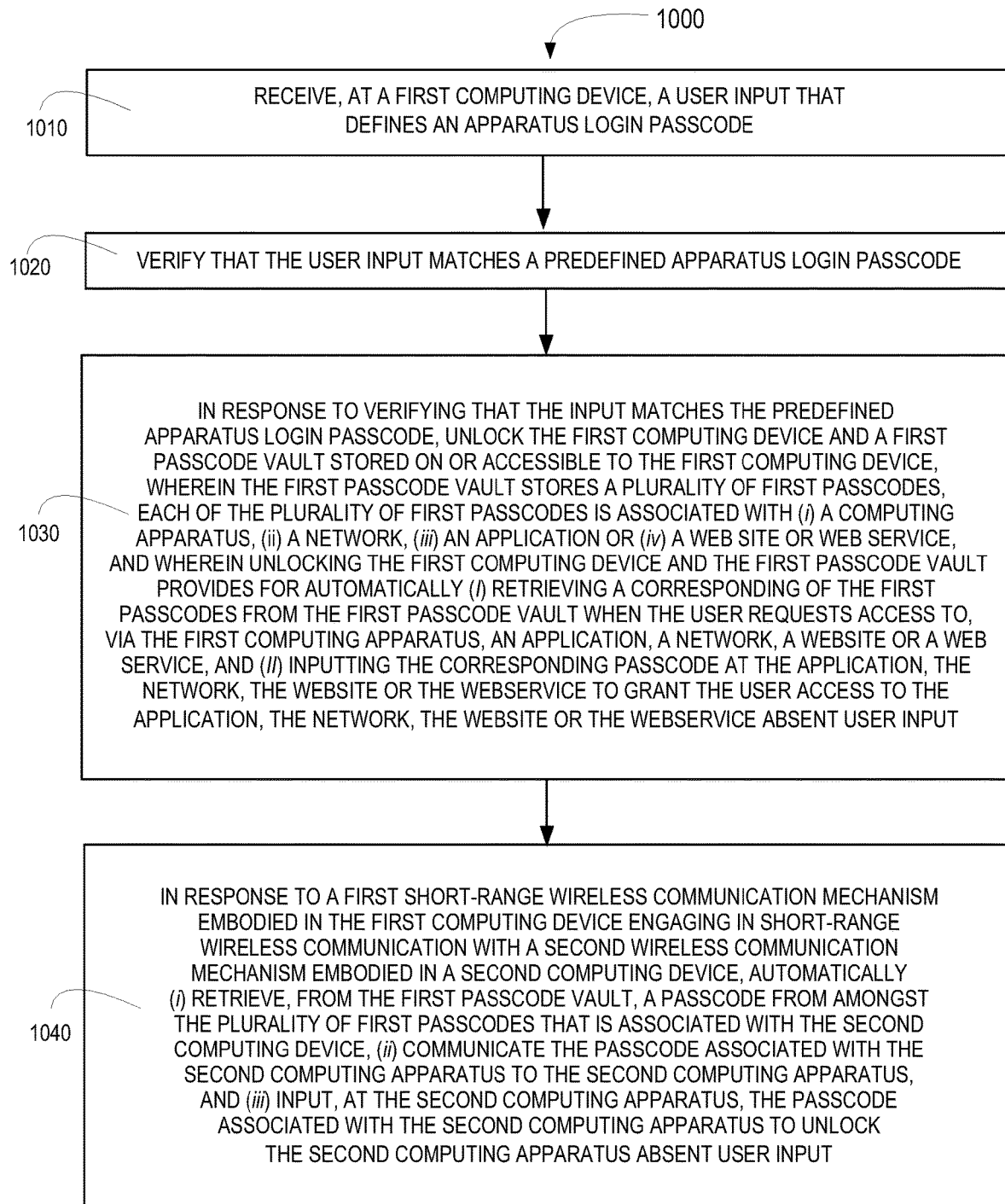
Figure 8:
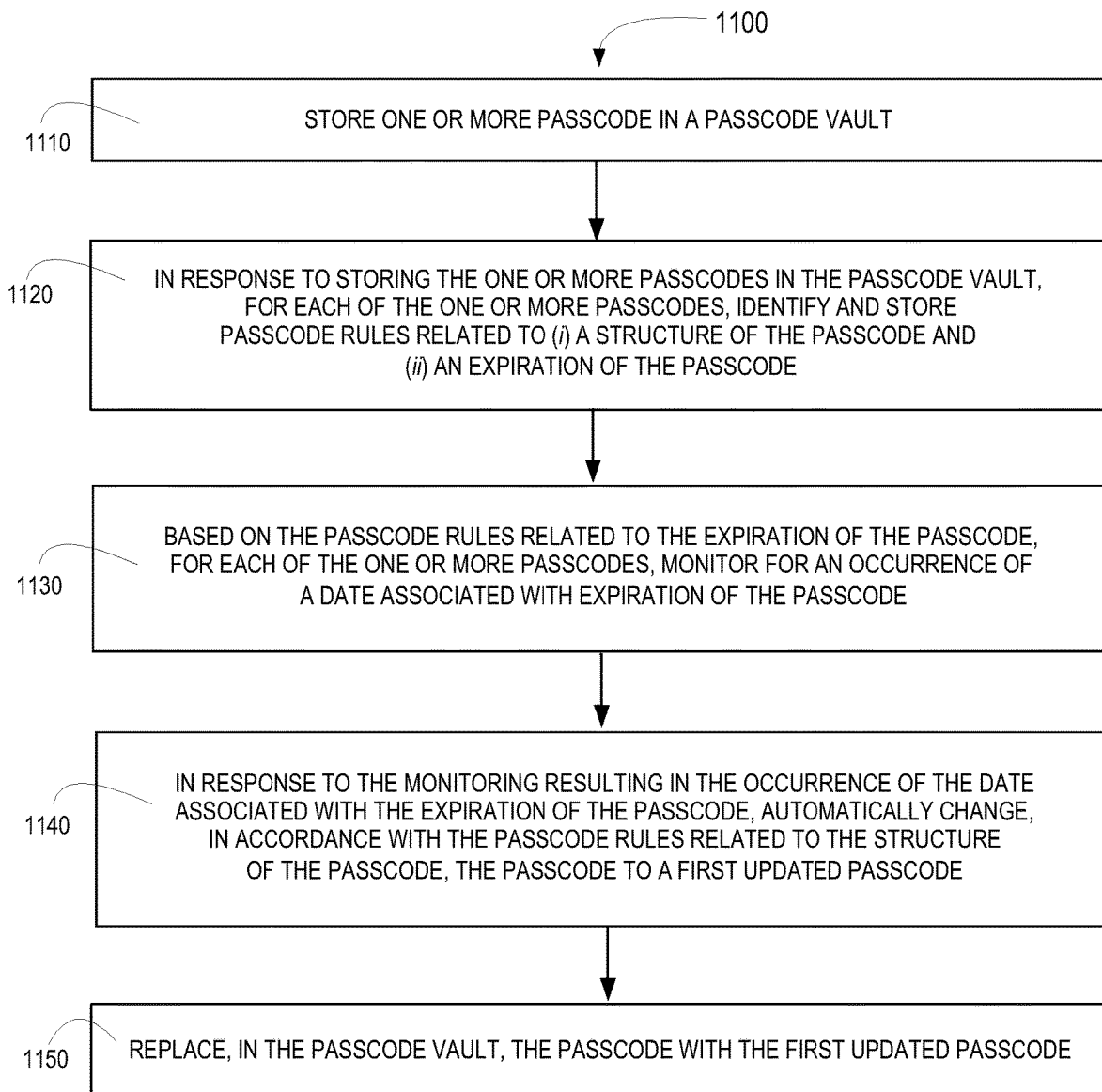
Figure 9:
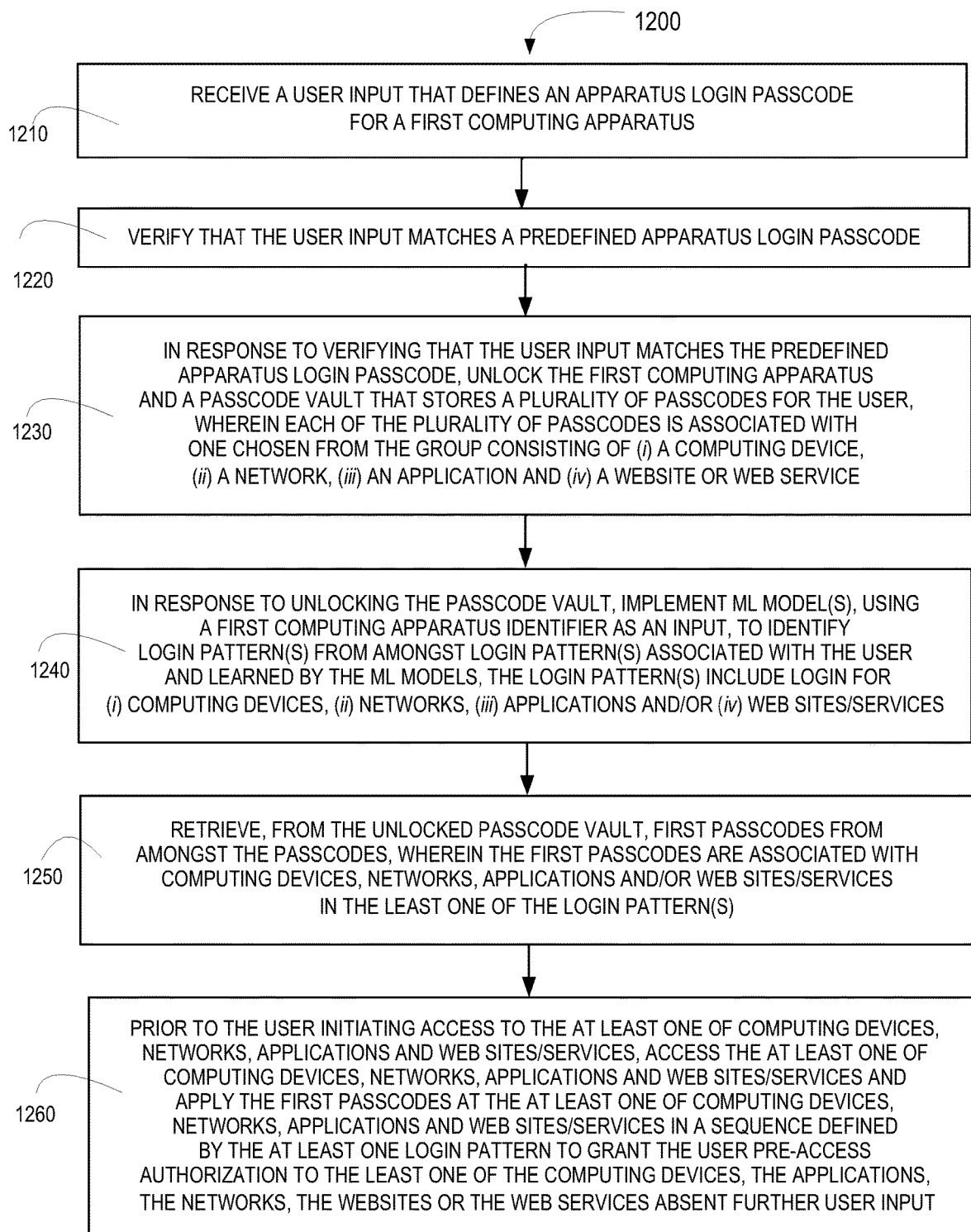

Having thus described embodiments of the disclosure in general terms, reference will now be made to the accompanying drawings, wherein:

FIG. 1 is a schematic/block diagram of a system for computing login management, in accordance with embodiments of the present invention;

FIG. 2 is a block diagram of a computing apparatus including a computing login management application, in accordance with embodiments of the present invention;

FIG. 3 is a schematic/block diagram of an addition system for computing login management, in accordance with embodiments of the present invention;

FIG. 4 is a block diagram of a computing platform for passcode management, in accordance with embodiments of the present invention;

FIG. 5 is a schematic/block diagram of a system for computing login management including machine-learning (ML) models trained to learn login patterns, in accordance with embodiments of the present invention;

FIG. 6 is a schematic/block diagram of an additional system for computing login management including machine-learning (ML) models trained to learn login patterns, in accordance with embodiments of the present invention;

FIG. 7 is a flow diagram of a method for computing login management, in accordance with embodiments of the present invention;

FIG. 8 is a flow diagram of a method for passcode management, in accordance with embodiments of the present invention; and FIG. 9 is a flow diagram of a method for computing login management implementing ML models trained to learn login patterns, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for a single device-level passcode that is configured, upon verification, to unlock a passcode vault, such that, automated login/access to other computing devices, applications and/or websites/web services, which have the user's passcodes stored in the vault, occurs. In this regard, the user possesses a single passcode which provides access to a computing device (e.g., typically the first computing device that user will interface with during their day, such as, their mobile device/smart telephone). Entry of the single device-level passcode unlocks a passcode vault that stores most, if not all, of the user's passcodes mapped to their respective device, application, network, web site/service or the like. The unlocking of the passcode vault means that as the user accesses another device, a network, web site/service or launches an application having a passcode stored in the unlocked passcode vault, the passcode will automatically be communicated to and/or inputted into the requisite entry field without user input and, in certain instances, without user knowledge. As a result, the user can gain seamless access to most, if not all, of their requisite computing needs without having to be burdened with performing a login process and/or recalling the login credentials required to access desired devices, networks, applications, web sites/services or the like.

Specifically, automated login access to other computing devices is made possible by short-range wireless communication (e.g., Near Field Communication (NFC), BLUETOOTH® or the like) between the computing devices. For example, once the single passcode has been inputted and verified at the first computing device equipped with a short-range wireless mechanism (e.g., the user's mobile device/smart device) to unlock the passcode vault, the first computing device may be brought into close proximity of another computing device equipped with a similar short-range wireless mechanism (e.g., the user's Personal Computer (PC) or the like). As a result of the initial short-range wireless communication between the two computing devices (i.e., the initial handshake process between the two computing devices occurs), the other computing device may be awoken, the passcode vault may be accessed to retrieve the passcode associated with the other computing device, the passcode communicated to the other computing device and entered at the other computing device to allow the user to access the other computing device absent user input and/or user knowledge of the login process.

In further specific embodiments of the invention, the single device-level passcode is mapped to one and, typically multiple, user characteristics, which have previously been verified. User characteristics may include, but are not limited to, body characteristics, such as facial image, eye prints, fingerprints or the like, functional characteristics, such as input/typing rate/speed, cadence, error patterns or the like. In specific embodiments of the invention each character or segment of the passcode is mapped to a different user characteristic. As part of a multifactor authentication, the user characteristics are acquired and verified simultaneously with the user's entry and verification of the single passcode as a means of authenticating the user (i.e., providing device access and unlocking the passcode vault). In other instances, the user characteristics are acquired and verified continuously throughout the user's device session as a means for continuous multi-factor authentication (i.e., the passcode vault remains unlocked as long as the user characteristics are verified). In still further embodiments of the invention, the user characteristics are acquired and verified each time a user initiates access of another computing device, network, web site/service or launches an application in which associated passcodes are stored and retrieved from the passcode vault. It should be noted that in all instances, the user may be unaware of which user characteristics are mapped to the passcode and, thus, unaware that user characteristics are being acquired or otherwise identified.

Referring to FIG. 1, a schematic/block diagram is presented of a system 100 for computing login management, in accordance with embodiments of the invention. The system 110 may be implemented in conjunction with one or more distributed communication networks 110, such as the Internet, intranet(s), cellular network(s) and the like. System 100 includes a first computing apparatus 200, which, in the illustrated example of FIG. 1, is a mobile communication device, such as a smart telephone or the like. First computing apparatus 100 includes first memory 202, one or more first computing processor devices 204 in communication with first memory 202 and a first short-range wireless communication mechanism 206 (e.g., Near Field Communication, BLUETOOTH® (operating in the 2400 to 2483.5 MHz frequency range), ZIGBEE® (operating in 2400 MHz frequency) and the like) executable by at least one of the first computing processor device(s).

First memory 202 stores a first passcode vault 210 which stores a plurality of first passcodes 220. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the first passcodes 220 is associated with (i.e., provides the user access to) (i) a computing apparatus 222, (ii) a network 224, (iii) an application 226, (iv) a web site/service 228 or any other computer-based technology requiring a passcode for access purposes.

Additionally, first memory 202 stores a computing login management application 230 that is executable by at least one of the first computing processor devices 204. Computing login management application 230 is configured to receive a user input 232 that defines an apparatus login passcode 234-1 (i.e., a passcode that is configured to allow a user to access the mobile communication device (i.e., first computing apparatus 200)). In response to receiving user input 232, computing login management application 230 is configured to verify that the user input 232 matches a predefined apparatus login passcode 234-2 (i.e., a login passcode previously assigned to or chosen by the user and saved in first memory 202 and/or first passcode vault 210). In response to verifying that the user input 232 matches the predefined apparatus login passcode 234-2, computing login management application 230 is configured to unlock 236 (i) first computing apparatus 200 (i.e., provide the user access to the functionalities of first computing apparatus 200) and (ii) first passcode vault 210.

Unlocking of first passcode vault 210 provides for, in response to the user of first computing apparatus 200 launching an application 226 stored on or accessible via the first computing apparatus 200, or requesting access to a network 224 or a web site/service 228, retrieving a corresponding first passcode 220 from first passcode vault 210 and inputting the corresponding first passcode 220 at the application 226, network 224 or web site/service 228 to grant the user access to the application 226, network 224 or web site service 228 absent any further user input. In this regard, the login process for the application 226, network 224 or web site/service 228 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

System 100 additionally includes second computing apparatus 300, which, in the illustrated example of FIG. 2, is a personal computer (PC). Second computing apparatus 300 includes second memory 302, one or more second computing processor device(s) 304 in communication with second memory 302 and a second short-range wireless communication mechanism 306 (e.g., Near Field Communication, BLUETOOTH® (operating in the 2400 to 2483.5 MHz frequency range), ZIGBEE® (operating in 2400 MHz frequency) and the like) executable by at least one of the second computing processor device(s) 304. One of ordinary skill in the art will appreciate that first and second short range wireless communication mechanisms 206 and 306 are required to be of a same type or at least capable of communicating via a same short-range wireless communication technology.

In response to first and second short range wireless communication mechanisms 206 and 306 engaging in short-range wireless communication (i.e., first and second computing apparatus 200 and 300 coming within close proximity of one another), computing login management application 230 is configured to retrieve a first passcode 220 from first passcode vault 210 associated with second computing apparatus 300, communicate the associated first passcode 220 to the second computing apparatus 300 (typically via the backend using the distributed communication network 110), and input the associated first passcode 220 within computing login management application 330 of the second computing apparatus 300 to unlock 336 the second computing apparatus 300 absent any user input. In this regard, once the first and second computing apparatus 200 and 300 communicate via short-range wireless communication (i.e., during the handshake process), the first computing apparatus 200 becomes the proxy of the second computing apparatus in terms of computing login management. In specific embodiments of the invention, the user will have preconfigured settings within the computing login management application 230 identifying which secondary computing apparatus, such as second computing apparatus 300 are to be used for automated login. Similar to application, network, or web site/service login on the first computing apparatus 200, the login process for the second computing apparatus 300 occurs in the background without (i) requiring the user to enter their respective passcode or, in some embodiments, (ii) confirm the automated retrieval of their passcode from the first passcode vault 210 and/or automated input of their passcode at the second computing apparatus 300. As such, according to specific embodiments of the invention, the user may be unaware that the login/unlocking process is or has occurred at the second computing apparatus 300.

Referring to FIG. 2, a block diagram is presented of first computing apparatus 200 including computing login management application 230, in accordance with embodiments of the present invention. In addition to providing greater details of computing login management application 230, FIG. 2 highlights various alternate embodiments of the invention. First computing apparatus 200 may comprise one or multiple computing devices, such as a mobile device(s) (e.g., laptop, tablet, smart telephone, smart watch, smart glasses or the like). As previously discussed, first computing apparatus 200 includes first memory 302, which may comprise volatile and/or non-volatile memory, such as read-only memory (ROM) and/or random-access memory (RAM), EPROM, EEPROM, flash cards, or any memory common to computing platforms. Moreover, memory 202 may comprise cloud storage, such as provided by a cloud storage service and/or a cloud connection service.

Further, first computing apparatus 200 includes one or more first computing processing devices 204, which may be an application-specific integrated circuit ("ASIC"), or other chipset, logic circuit, or other data processing device. First computing processing device(s) 204 may execute one or more application programming interface (APIs) 208 that interface with any resident programs, such as computing login management application 230 or the like, stored in first memory 202 of first computing apparatus 200 and any external programs. First computing apparatus 200 may include various processing subsystems (not shown in FIG. 2) embodied in hardware, firmware, software, and combinations thereof, that enable the functionality of first computing apparatus 200 and the operability of first computing apparatus 200 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of first computing apparatus 200 may include any subsystem used in conjunction with computing login management application 230 and related tools, routines, sub-routines, applications, sub-applications, sub-modules thereof.

In specific embodiments of the present invention, first computing apparatus 200 additionally includes a communications module (not shown in FIG. 2) embodied in hardware, firmware, software, and combinations thereof, that enables electronic communications between components of first computing apparatus 200 and other networks and network devices. Thus, communication module may include the requisite hardware, firmware, software and/or combinations thereof for establishing and maintaining a network communication connection with one or more devices and/or networks.

As previously discussed in relation to FIG. 1, first memory 202 stores computing login management application 230 that is executable by at least one of the first computing processor devices 204. In specific embodiments of the system 100, computing login management application 230 is configured to map the apparatus login passcode 234 to previously captured/identified first user characteristics 240-1 (e.g., facial characteristics, such as facial image, portions of the facial image, facial movements, eye/iris pattern and the like), fingerprint(s), data entry (i.e., typing) patterns and/or rates and the like) and store the mapping in first memory 202, which may be first passcode vault 210. In specific embodiments of the invention, each character or segment (e.g., passcode as illustration/drawing) of the passcode is mapped to a different user characteristic.

As previously discussed in relation to FIG. 1, computing login management application 230 is configured to receive a user input 232 that defines an apparatus login passcode 234-1 and, in response, verify that the user input 232 matches a predefined apparatus login passcode 234-2. In additional specific embodiments of the system, in response to receiving the user input 232, computing login management application 230 is configured to capture or otherwise identify current user characteristics 240-2 and verify that the current user characteristics 240-2 match the first user characteristics 240-1 (i.e., the previously captured/identified and stored user characteristics) or match at least a portion of the first user characteristics. Thus, the verification of user characteristics 240 serves as an additional factor in a multi-factor user authentication process. In response to verifying that the user input 232 matches the predefined apparatus login passcode 234-2 and, in some embodiments, verifying that the current user characteristics 240-2 match the first user characteristics 240-1, computing login management application 230 is configured to unlock 236 (i) first computing apparatus 200 (i.e., provide the user access to the functionalities of first computing apparatus 200) and (ii) first passcode vault 210.

Unlocking of first passcode vault 210 provides for, in response to the user of first computing apparatus 200 launching an application 226 stored on or accessible via the first computing apparatus 200, or requesting access to a network 224 or a web site/service 228, retrieving a corresponding first passcode 220 from first passcode vault 210 and inputting the corresponding first passcode 220 at the application 226, network 224 or web site/service 228 to grant the user access to the application 226, network 224 or web site service 228 absent any further user input. In this regard, the login process for the application 226, network 224 or web site/service 228 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

In specific embodiments of the system, each of the first passcodes 220 stored in the first passcode vault 210 are mapped to user characteristics 240 (e.g., facial characteristics, such as facial image, portions of the facial image, facial movements, eye/iris pattern and the like), fingerprint(s), data entry (i.e., typing) patterns and/or rates and the like) and the mapping is stored in first passcode vault 210. In specific embodiments of the invention, each mapping may be different (i.e., each first passcode 220 is mapped to different user characteristics 240). In response to the user of first computing apparatus 200 launching an application 226 stored on or accessible via the first computing apparatus 200, or requesting access to a network 224 or a web site/service 228, computing login management application 230 is configured to capture or otherwise identify current user characteristics 240-2 and verify that the current user characteristics 240-2 match the user characteristics 240 mapped to the associated first passcode 220 (i.e., the previously captured/identified and stored user characteristics) or match at least a portion of the first user characteristics. In response to verifying that the current user characteristics 240-2 match the user characteristics 240 associated with the passcode, computing login management application 230 is configured to retrieve the corresponding first passcode 220 from first passcode vault 210 and inputting the corresponding first passcode 220 at the application 226, network 224 or web site/service 228 to grant the user access to the application 226, network 224 or web site service 228 absent any further user input.

In other specific embodiments of the system 100, in response to a predetermined event 250, computing login management application 230 is configured to re-map the apparatus login passcode 234 to second user characteristics 240-3 which are different that the set of the first user characteristics 240-1. In other specific embodiments of the system, in which the first passcodes 220 stored in the first passcode vault 210 are mapped to user characteristics 240, the occurrence of the predetermined event 250 may prompt computing login management application 230 to re-map of the first passcodes 220 to different user characteristics 240. In specific embodiments of the invention, the predetermined event 250 may be a specific date coinciding with expiration of the mapping or a determination that a security event that comprises the first computing apparatus 200 has or is occurring. In other instances, re-mapping of passcodes to user characteristics may occur periodically on a random schedule or on-demand (at the bequest of the user or the apparatus manufacturer).

In further specific embodiments of the invention, computing login management application 230 is configured to continuously capture 260 current user characteristics 240-2 during the user's first computing apparatus 200 login session and verify that the current user characteristics 240-2 match the first user characteristics 240-1 (or if re-mapped any subsequent user characteristics). In response to verifying that the current user characteristics match the first user characteristics 240-1, the first passcode vault 210 remains in an unlocked state (i.e., automatic retrieval and input of passcodes can occur). However, in the event that one or all of the current user characteristics do not match the first user characteristics or the user characteristics of record, the first passcode vault 210 may be locked (i.e., requiring the user to input their passcodes at applications, networks, web sites/services or the like) and, in some instances, the first computing apparatus 200 may be locked or otherwise disabled.

Referring to FIG. 3, additional features of the computing login management system 100 are shown, in accordance with additional embodiments of the invention. In response to first and second short-range wireless communication engaging in the short-range wireless communication and in response to the user of second computing apparatus 300 launching an application 226 stored on or accessible via the second computing apparatus 300, or requesting access to a network 224 or a web site/service 228 at the second computing apparatus 300, computing login management application 230 is configured to retrieve a corresponding first passcode 220 associated with the application 226, network 224 or web site/service 228 from first passcode vault 210, communicate the first passcode 220 to the second computing apparatus 300 (typically via the distributed communication network 110) and input the associated first passcode 220 at the application 226, network 224 or web site/service 228 to grant the user access to the application 226, network 224 or web site service 228 at/on the second computing apparatus 300 absent any further user input. In this regard, the login process for the application 226, network 224 or web site/service 228 at the second computing apparatus 300 occurs in the background without (i) requiring the user to enter their respective passcode or, in some embodiments, (ii) confirm the automated retrieval of their passcode from the first passcode vault 210 and/or automated input of their passcode at the application 226, network 224 or web site/service 228. As such, according to specific embodiments of the invention, the user may be unaware that the login process is or has occurred.

In additional embodiments of the system 100, second memory 302 of second computing apparatus 300 stores a second passcode vault 310 which stores a plurality of second passcodes 320. Each of the second passcodes 220 is associated with (i.e., provides the user access to) (i) a computing apparatus 322, (ii) a network 324, (iii) an application 326, (iv) a web site/service 328 or any other computer-based technology requiring a passcode for access purposes. Typically, some, if not most, of the computing apparatus 322, networks 324, applications 326 and/or web sites/services 328 having second passcodes 320 stored in the second passcode vault 310 will be the same as the computing apparatus 222, networks 224, applications 226 and/or web sites/services 228 having first passcodes 220 stored in the first passcode vault 210. In specific embodiments of the system 100, in response to the first and second short-range wireless communication mechanisms 206 and 306 engaging in short-range wireless communication, synchronization occurs between the first passcode vault 220 and the second passcode vault 310. Synchronization provides for the first passcode vault 220 and the second passcode vault 310 to store the same passcodes (i.e., store passcodes for the same computing apparatus 222, networks 224, applications 226 and/or web sites/services 228. As a result of synchronization, the second computing apparatus 300 need not rely on the first computing apparatus to retrieve and communicate first passcodes from the first passcode vault 210 when launching an application 226 or accessing a network 224 or web site/service 228 on the second computing apparatus 300. Rather, the second computing apparatus 300 can rely on retrieving and inputting second passcodes from the second passcode vault 310 which has been previously synchronized with the first passcode vault 210.

Referring to FIG. 4, a block diagram is presented of a computing platform 500 including a passcode management application 530, in accordance with embodiments of the present invention. The passcode management application 530 may be implemented in conjunction with embodiments of the invention discussed in relation to FIGS. 1-3 or the passcode management application 530 may constitute stand-alone embodiments of the invention. Computing platform 500 may comprise one or more computing devices, such as mobile computing devices, (e.g., laptop, tablet, smart telephone, smart watch, smart glasses or the like), PC(s), server(s) or the like. Computing platform 500 includes a memory 502 and one or more computing processor devices 504 in communication with the memory 502. Memory 502 stores a passcode vault 510 which stores a plurality of passcodes 520. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the passcodes 520 is associated with (i.e., provides the user access to) (i) a computing apparatus 522, (ii) a network 524, (iii) an application 526, (iv) a web site/service 528 or any other computer-based technology requiring a passcode for access purposes.

Memory 502 additionally stores passcode management application 530 that is executable by at least one of the computing processor device(s) 504. In response to storing, in the passcode vault 510, a passcode 520-1 associated with a computing apparatus 522, network 524, application 526 or web site/service 528, passcode management application 530 is configured to identify and store passcode rules 530 associated with the passcode 520-1. Passcode rules 530 include, but are not limited to, (i) passcode structure rules 540 that define structure requirements, such as minimum/maximum character length, character type requirements (e.g., number character requirements, special character requirements and the like), character case requirements and the like, and (ii) passcode expiration rules 550 that define a time period during which the passcode is valid/active (e.g., a time period until expiration or the like). In specific embodiments of the system, the passcode rules are identified by accessing the application or crawling the website or network to identify the passcode rules associated with passcode 520-1.

Based on the passcode expiration rules 540, the passcode 520-1 is monitored 560 for an occurrence of an expiration-related date 552, which may the actual date on which the passcode expires or one or more days prior to the date on which the passcode expires. In response to the monitoring resulting in the occurrence of the expiration-related date 552, the passcode 520-1 is automatically changed, in accordance with the passcode structure rules 540 to a first updated passcode 520-2 and the passcode 520-1 stored in the passcode vault 510 is replaced with the first update passcode.

In specific optional embodiments of the invention, memory 502 of computing platform 500 stores a security threat monitoring application 720 that is executable by at least one of the computing device processors 504. Security threat monitoring application 720 is configured to monitor or receive results of third-part monitoring of computing apparatus 522, networks 524, applications 526 or web site/service 528 having corresponding passcodes 520 stored in the passcode vault 510 for occurrences of security threats (e.g., breaches that compromise passcodes or the like). In response to the monitoring resulting in the occurrence of a security threat, security threat monitoring application 570 notifies passcode management application 530, which responds by automatically changing, in accordance with the passcode structure rules 540, the existing passcode (i.e., first updated passcode 520-2) to a second updated passcode 520-3 and replacing the first updated passcode 520-2 stored in the passcode vault 510 with the second update passcode 520-3.

In specific optional embodiments of the invention, memory 502 of computing platform 500 stores a passcode rules monitoring application 580 that is executable by at least one of the computing device processors 504. Passcode rules monitoring application 720 is configured to monitor or receive results of third-part monitoring of computing apparatus 522, networks 524, applications 526 or web site/service 528 having corresponding passcodes 520 stored in the passcode vault 510 for changes in passcode rules. In response to the monitoring resulting in changes to passcode rules, the currently stored passcode rules are replaced with updated passcode rules that reflect the changes and subsequent changes to passcodes are conducted with the updated passcode rules.

Moreover, in additional optional embodiments of the invention, passcode management application is further configured to generate, and initiate communication of to the user, an alert 590 that is configured as a password change notification 592. In specific embodiments of the invention, alert 590 is configured to include a hyperlink 594 that, when activated, provides access to the updated/changed passcode.

Referring to FIG. 5, a block diagram is presented of a system 600 for computing login management, in accordance with embodiments of the present invention. The computing login management system 600 may be implemented in conjunction with embodiments of the invention discussed in relation to FIGS. 1-4 or the computing login management system 600 may constitute stand-alone embodiments of the invention. The system 600 includes one or more machine-learning (ML) models 700 that are trained to learn login patterns 710 for users 602. The login patterns define a user's typical series of computing logins that they perform dependent upon their location or time of day/week or the like. For example, a login pattern may be associated with a user's place of employment at the start of weekday (e.g., Monday-Friday). The logins that are included within a login pattern 710 may include, but are not limited to, one or more of (i) computing devices/apparatus, (ii) networks, (iii) applications, (iv) web sites/services and the like.

In addition, system 600 includes first computing apparatus 800, which as shown in the illustrated example of FIG. 5 may be a mobile device, such as a smart telephone or the like. First computing apparatus 800 includes first memory 802 and one or more computing processor devices 804 in communication with memory 802. First memory 810 stores a passcode vault 810 which stores a plurality of passcodes 820. The term "passcode" as used herein includes any text-based user credentials, include a username and/or password (i.e., alphanumeric and, in some instances, including special non-alphanumeric characters) or any non-text-based user credentials, such as an illustration/drawing or the like. Each of the passcodes 820 is associated with (i.e., provides the user access to) (i) a computing device 822, (ii) a network 824, (iii) an application 826, (iv) a web site/service 828 or any other computer-based technology requiring a passcode for access purposes.

Additionally, first memory 802 stores a computing login management application 830 that is executable by at least one of the first computing processor devices 804. Computing login management application 830 is configured to receive a user input 832 that defines an apparatus login passcode 834 (i.e., a passcode that is configured to allow a user to access the mobile communication device (i.e., first computing apparatus 800)). In response to receiving user input 832, computing login management application 830 is configured to verify that the user input 832 matches a predefined apparatus login passcode 834-1 (i.e., a login passcode previously assigned to or chosen by the user and saved in first memory 802, such as passcode vault 810). In response to verifying that the user input 832 matches the predefined apparatus login passcode 834-1, computing login management application 230 is configured to unlock 840 (i) first computing apparatus 800 (i.e., provide the user access to the functionalities of first computing apparatus 800) and (ii) passcode vault 810.

Unlocking of first passcode vault 810 provides for, in response to the user of first computing apparatus 800 launching an application 826 stored on or accessible via the first computing apparatus 800, or requesting access to a network 824 or a web site/service 828, retrieving a corresponding passcode 820 from passcode vault 210 and inputting the corresponding passcode 820 at the application 826, network 824 or web site/service 828 to grant the user access to the application 826, network 824 or web site service 828 absent any further user input. In this regard, the login process for the application 826, network 824 or web site/service 928 occurs in the background without (i) requiring the user to enter their respective passcode or, in some embodiments, (ii) confirm the automated retrieval of their passcode 820 from the passcode vault 810 and/or automated input of their passcode 810 at the application 826, network 824 or web site/service 828. As such, according to specific embodiments of the invention, the user may be unaware that the login process is or has occurred.

In response to unlocking 840 first computing apparatus 800 and passcode vault 810, computing login management application 830 is further configured to execute at least one of the ML model(s) 700, using at least a first computing apparatus identifier (ID) 852 as an input 850, to identity at least one login pattern 710-1 from amongst the previously learned login patterns 710. In optional embodiments of the system 600, the first computing apparatus includes a location-determining mechanism (e.g., Global Positioning System (GPS) mechanism or the like) configured to determine a physical location of the first computing apparatus 800. In such embodiments of the system 600, the computing login management application is further configured to implement the location-determining mechanism to determine the current location 854 of the first computing apparatus 800 and the inputs 850 to the ML model(s) 700 include the current location 854 of the first computing apparatus 800. In other optional embodiments of the system 600, the first computing apparatus includes a time-measurement mechanism (e.g., a clock or the like) configured to determine a time. In such embodiments of the system 600, the computing login management application is further configured to implement the time-measurement mechanism to determine the current time 856 and the inputs 850 to the ML model(s) 700 include the current time 856.

In response to identifying login pattern(s), computing login management application 830 is further configured to retrieve a corresponding first passcode 820-1 from passcode vault 810. The first passcodes 820-1 being associated with computing devices, 822, networks 824, applications 826 and/or web sites/services 828 in the login pattern(s) 710-1. Moreover, computing login management application 830 is further configured to, in advance of the user initiating access to the computing device(s) 822, network(s) 824, application(s) 836 and/or web site(s)/service(s) 828 (i.e., pre-user access 860), access 870 the computing device(s) 822, network(s) 824, application(s) 836 and/or web site(s)/service(s) 828 in the login pattern(s) 710-1 and apply/enter 880 the first passcodes 820-1 in the sequence/order defined by login pattern(s) 710-1. Thus, in effect, the user is pre-authorized (i.e., already logged-in to) the computing device(s), network(s), application(s) and/or web site(s)/service(s) in the login pattern prior to the user interfacing with or initiating access at the computing device(s), network(s), application(s) and/or web site(s)/service(s). It should be noted that such pre-authorized access occurs without user input and, in some instances, without user knowledge of the automated login process.

Referring to FIG. 6, a block diagram is presented of an alternate system 600 for computing login management, in accordance with embodiments of the present invention. The computing login management system 600 may be implemented in conjunction with embodiments of the invention discussed in relation to FIGS. 1-5 or the computing login management system 600 may constitute stand-alone embodiments of the invention. While the system 600 described in relation FIG. 6 includes the ML learning models 700 shown and discussed in relation to FIG. 5, for the sake of conciseness and brevity such ML models are not shown or discussed in relation to FIG. 6. Further, first computing apparatus 800 includes all aspects discussed in relation to FIG. 5 and, for the sake of brevity, such aspects will not be discussed herein in relation to FIG. 6. First computing apparatus 800 additionally includes first a first short-range wireless communication mechanism 206 (e.g., Near Field Communication, BLUETOOTH® (operating in the 2400 to 2483.5 MHz frequency range), ZIGBEE® (operating in 2400 MHz frequency) and the like) executable by at least one of the first computing processor device(s) 804.

In addition, system 600 includes a second computing apparatus 900 including second memory 902, one or more second computing processor device(s) 904 in communication with second memory 902 and a second short-range wireless communication mechanism 906 (e.g., Near Field Communication, BLUETOOTH® (operating in the 2400 to 2483.5 MHz frequency range), ZIGBEE® (operating in 2400 MHz frequency) and the like) executable by at least one of the second computing processor device(s) 904. One of ordinary skill in the art will appreciate that first and second short range wireless communication mechanisms 806 and 906 are required to be of a same type or at least capable of communicating via a same short-range wireless communication technology.

In response to first and second short range wireless communication mechanisms 806 and 906 engaging in short-range wireless communication (i.e., first and second computing apparatus 800 and 900 coming within close proximity of one another), computing login management application 830 is configured to (i) retrieve a first passcode 820-1 from first passcode vault 810 that is associated with second computing apparatus 900 and included in one of the login pattern(s) 710-1, (ii) communicate the associated first passcode 820-1 to the second computing apparatus 900 (typically via the backend using the distributed communication network 110), and (iii) input the associated first passcode 820-1 within computing login management application 930 of the second computing apparatus 900 to unlock 940 the second computing apparatus 900 absent any user input. In this regard, once the first and second computing apparatus 800 and 900 communicate via short-range wireless communication (i.e., during the handshake process), the first computing apparatus 800 becomes the proxy of the second computing apparatus 900 in terms of computing login management. In specific embodiments of the invention, the user will have preconfigured settings within one or more of the computing login management applications 830 and/or 930 identifying which secondary computing apparatus, such as second computing apparatus 900 are to be used for automated login. Similar to application 826, network 824, or web site/service 828 login on the first computing apparatus 800, the login process for the second computing apparatus 900 occurs in the background without (i) requiring the user to enter their respective passcode or, in some embodiments, (ii) confirm the automated retrieval of their passcode from the first passcode vault 810 and/or automated input of their passcode at the second computing apparatus 900. As such, according to specific embodiments of the invention, the user may be unaware that the login/unlocking process is or has occurred at the second computing apparatus 900.

In the event that the login pattern(s) include computing apparatus 822, network(s), applications 826 and/or web sites/services 828 that are accessed on or via the second computing apparatus 900, once the second computing apparatus 940 has been unlocked 940, computing login management application 830 is further configured to retrieve, from the passcode vault 810, corresponding first passcode(s) 820-1 associated with computing devices, 822, networks 824, applications 826 and/or web sites/services 828 in the login pattern(s) 710-1 that are being accessed on or via the second computing apparatus 900 and communicate the first passcodes 820-1 to the second computing apparatus 800 (typically via the backend distributed communication network 110). Moreover, computing login management application 830 is further configured to, in advance of the user initiating access to the computing device(s) 822, network(s) 824, application(s) 836 and/or web site(s)/service(s) 828 on the second computing apparatus 900 (i.e., pre-user access 960), access 970 the computing device(s) 822, network(s) 824, application(s) 836 and/or web site(s)/service(s) 828 in the login pattern(s) 710-1 and apply/enter 980 the first passcodes 820-1 in the sequence/order defined by login pattern(s) 710-1. Thus, in effect, the user is pre-authorized (i.e., already logged-in to) the computing device(s), network(s), application(s) and/or web site(s)/service(s) in the login pattern on the second computing apparatus 900 prior to the user interfacing with or initiating access at the computing device(s), network(s), application(s) and/or web site(s)/service(s). It should be noted that such pre-authorized access occurs without user input and, in some instances, without user knowledge of the automated login process.

Referring to FIG. 7, a flow diagram is depicted of a method 1000 for computing login management, in accordance with embodiments of the present invention. At Event 1010, a user input is received, at a first computing apparatus (e.g., mobile device) from a user that defines an apparatus login passcode and, at Event 1020, a verification is performed to determine whether the user input matches a predefined apparatus login passcode. In response to the verification determining that the user input matches the predefined apparatus login passcode, at Event 1030, the (i) first computing apparatus and (ii) a first passcode vault stored on or accessible to the first computing apparatus are unlocked. The first passcode vault stores a plurality of first passcodes, each first passcode is associated with a (i) a computing apparatus, (ii) a network, (iii) an application, or (iv) a web site/service.

Unlocking the first passcode vault provides for automatically (i) retrieving a corresponding first passcode from the first passcode vault when the user requests access to an application, a network, or a web site/service having the corresponding first passcode stored in the first passcode vault and (ii) inputting the corresponding first passcode at the application, network, web site/service to grant the user access to the application, network or web site/service absent user input. In other words, the login process occurs in the background without user input and, in some instances, without user knowledge.

In response to a first short-range wireless communication mechanism embodied in the first computing apparatus engaging in short-range wireless communication with a second short-range wireless communication mechanism embodied in a second computing apparatus, at Event 1040, the first passcode corresponding to the second computing apparatus is retrieved from the first passcode vault, communicated to the second computing apparatus (typically via a backend network, such as the Internet and or intranet(s)) and inputted at the second computing apparatus to unlock the second computing apparatus absent user input. In this regard, the method provides for the handshake short-wireless communication between the first and second computing apparatus to trigger the first computing apparatus to become proxy for the second computing apparatus for purposes of login management. In this regard, the handshake short-wireless communication between the first and second computing apparatus triggers automatic user login at the second computing apparatus absent user input.

Referring to FIG. 8, a flow diagram is depicted of a method 1100 for passcode management, in accordance with embodiments of the present invention. At Event 1110, one or more passcodes are stored in a passcode vault of a computing apparatus. In response to storing the passcodes in the passcode vault, at Event 1120, passcode rules are identified for each of the passcodes and are stored in, or otherwise accessible to the computing apparatus (e.g., the passcode rules are stored in the passcode vault). The passcode rules include, but are not limited to, passcode structure rules (e.g., passcode character requirements including minimum and/or maximum characters, character type requirements including number of numeric or special characters required and the like) and passcode expiration rules (e.g., period during a passcode is valid or the like).

In response to identifying the passcode rules, at Event 1130, each of the passcodes are monitored for an occurrence of a date associated with the passcode expiration rules and, in response to monitoring resulting in the occurrence of the data associated with the passcode expiration rules, at Event 1140, the passcode is automatically changed to a first updated passcode in accordance with the passcode rules, such as passcode structure rules and the like. In response to changing the passcode, at Event 1150, the passcode stored in the passcode vault is replaced with the first updated passcode. As such, as a result of the passcode changing in an automated manner, without user input or, in some embodiments, without user confirmation, the user is assured that the passcode being presented is a valid passcode and avoids the need to change an expired passcode at the time of passcode entry (i.e., when the user desires access to the computing device, network, application, web site/service or the like). In alternate embodiments of the method, the entities associated with the passcodes are monitored for security threats and, in response to the monitoring resulting in a security threat (e.g., passwords comprised or the like), the passcode is automatically changed to a further updated passcode in accordance with the passcode rules. In other alternate embodiments of the method, the entities associated with the passcodes are monitored for changes to the passcode rules and, in response to monitoring determining a change in passcode rules, the stored passcode rules are updated to reflect the change in the passcode rules and subsequent passcode changes occur in accordance with the updated passcode rules.

Referring to FIG. 9, a flow diagram is depicted of a method 1200 for computing login management, in accordance with embodiments of the present invention. At Event 1210, a user input is received from a user that defines an apparatus login passcode for a first computing apparatus, such as a mobile device. In response the receiving the user input, at Event 1220, a verification process determines whether the user input whether the user input matches a predefined apparatus login passcode. In response to the verification determining that the user input matches the predefined apparatus login passcode, at Event 1230, the (i) first computing apparatus and (ii) a passcode vault stored on or accessible to the first computing apparatus are unlocked. The passcode vault stores a plurality of first passcodes, each first passcode is associated with a (i) a computing device, (ii) a network, (iii) an application, or (iv) a web site/service.

Unlocking the passcode vault provides for automatically (i) retrieving a corresponding first passcode from the passcode vault when the user requests access to an application, a network, or a web site/service having the corresponding first passcode stored in the first passcode vault and (ii) inputting the corresponding first passcode at the application, network, web site/service to grant the user access to the application, network or web site/service absent user input. In other words, the login process occurs in the background without user input and, in some instances, without user knowledge.

In response to unlocking the passcode vault, at Event 1240, machine-learning (ML) model(s) are executed using, at least, a first computing apparatus identifier as an input, to identify login pattern(s) from amongst login patterns associated with the user and learned by the ML model(s). The login pattern(s) include login for (i) computing devices, (ii) networks, (iii) applications, and/or (iv) a web sites/services.

In response to identifying the login pattern(s), at Event 1250, first passcodes are retrieved from the unlocked passcode vault that are associated with the (i) computing devices, (ii) networks, (iii) applications, and/or (iv) a web sites/services included in the login patterns.

Prior to the user initiating access to the (i) computing devices, (ii) networks, (iii) applications, and/or (iv) a web sites/services included in the login patterns, at Event 1260, the (i) computing devices, (ii) networks, (iii) applications, and/or (iv) a web sites/services included in the login patterns are accessed and the first passcodes applied in the sequence defined in the login pattern(s) to grant the user pre-access authorization to the (i) computing devices, (ii) networks, (iii) applications, and/or (iv) a web sites/services included in the login patterns absent further user input.

Thus, present embodiments of the invention discussed in detail above, the present invention provides for a single device-level passcode which, upon verification, unlocks a passcode vault, such that, automated login/access to other computing devices, applications and/or websites/web services, which have the user's passcodes stored in the vault, occurs. Specifically, in the case of other computing devices, short-range wireless communication between the initial logged-in computing device and another computing device triggers retrieval of the other computing devices passcode from the passcode vault and automated user log-in at other computing device. In specific embodiments of the invention, the passcode is mapped to previously-captured user characteristics, such that multi-factored authentication including user characteristic verification occurs at the time the passcode vault is unlocked (i.e., when the single passcode is entered), continuously throughout the device session and/or when the passcode vault is accessed to retrieve a passcode for another device, network, application or web site/service.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for computing login management, the system comprising:
    a first computing apparatus including a first memory, one or more first computing processor devices in communication with the first memory and a first short-range wireless communication mechanism executable by at least one of the one or more first computing processor devices, wherein the first memory stores:
        a first passcode vault that stores a plurality of first passcodes, each of the plurality of first passcodes is associated with one chosen from the group consisting of (i) a computing apparatus, (ii) a network, (iii) an application and (iv) a website or web service, and
        a computing login management application that is executable by at least one of the one or more first computing processor devices and is configured to:
            receive a user input from a user that defines an apparatus login passcode,
            verify that the user input matches a predefined apparatus login passcode, and
            in response to verifying that the user input matches the predefined apparatus login passcode, unlock the first computing apparatus and the first passcode vault, wherein unlocking the first computing apparatus and the first passcode vault provides for automatically (i) retrieving a corresponding one of the plurality of first passcodes from the first passcode vault when the user requests access to, via the first computing apparatus, an application, a network, a website or web service, and (ii) inputting the corresponding first passcode at the application, the network, the website or the web service to grant the user access to the application, the network, the website or the web service absent further user input; and
    a second computing apparatus including a second memory, one or more second computing processor devices in communication with the second memory, and a second short-range wireless communication mechanism executable by at least one of the one or more second computing processor devices,
    wherein, in response to the first and second short-range wireless communication mechanisms engaging in short-range wireless communication, the computing login management application is further configured to automatically (i) retrieve a passcode associated with the second computing apparatus from amongst the plurality of first passcodes stored in the first passcode vault, (ii) communicate the passcode associated with the second computing apparatus to the second computing apparatus and (iii) input, at the second computing apparatus, the passcode associated with the second computing apparatus to unlock the second computing apparatus absent user input.

2. The system of claim 1, wherein, in response to the first and second short-range wireless communication mechanisms engaging in the short-range wireless communication, the computing login management application is further configured to automatically (i) retrieve a corresponding one of the plurality of first passcodes from the first passcode vault when the user requests access to, via the second computing apparatus, an application, a network, a website or a web service, (ii) communicate the corresponding first passcode associated with the application, the network, the website or the web service to the second computing apparatus and (iii) input the corresponding first passcode at the application, website or webservice to grant the user access, on the second computing apparatus, to the corresponding application, network, website or web service absent user input.

3. The system of claim 1, wherein the computing login management application is further configured to:
    map the device logon passcode to one or more first user characteristics previously captured or identified and store the mapping within the first memory,
    in response to verifying that the user input matches the predefined apparatus login passcode,
    capture or identify current user characteristics,
    verify that the current user characteristics match the first user characteristics, and
    in further response to verifying that the current user characteristics match the first user characteristics, unlock the first computing apparatus and the first passcode vault.

4. The system of claim 3, wherein the computing login management application is further configured to:
    map each character or segment of the device logon passcode to a corresponding one of a plurality of first user characteristics previously captured or identified.

5. The system of claim 3, wherein the computing login management application is further configured to:
in response to occurrence of a predetermined event, re-map the device logon passcode to one or more second user characteristics previously captured or identified, wherein at least one of the second user characteristics is different than at least one of the first user characteristics.

6. The system of claim 3, wherein the computing login management application is further configured to:
in response to unlocking the first computing apparatus and the first passcode vault, continuously capture or identify current user characteristics,
verify that the current user characteristics match the first user characteristics, and
in response to verifying that the current user characteristics match the first user characteristic, maintain the first passcode vault as unlocked.

7. The system of claim 3, wherein the computing login management application is further configured to:
in response to the first and second short-range wireless communication mechanisms engaging in short-range wireless communication, capture or identify current user characteristics,
verify that the current user characteristics match the first user characteristics, and
in response to verifying that the current user characteristics match the first user characteristics and inputting the passcode associated with the second computing apparatus, unlock the second computing apparatus absent user input.

8. The system of claim 1, wherein the second memory of the second computing apparatus stores a second passcode vault that stores a plurality of second passcodes, each of the plurality of second passcodes is associated with one chosen from the group consisting of (i) a computing apparatus, (ii) an application and (iii) a web site or web service,
wherein the computing login management application is further configured to:
in response to the first and second short-range wireless communication mechanisms engaging in short-range wireless communication, synchronize the first passcode vault with the second passcode vault, wherein synchronization allows for the first and second passcodes stored in the first and second passcode vaults to be retrieved and inputted at applications, networks, websites or web services on either the first or second computing apparatus.

9. A computer-implemented method for computing login management, the method being executable by one or more computing processor devices and comprising:
receiving, at a first computing apparatus, a user input from a user that defines an apparatus login passcode;
verifying that the user input matches a predefined apparatus login passcode;
in response to verifying that the user input matches the predefined apparatus login passcode, unlocking the first computing apparatus and a first passcode vault stored on or accessible to the first computing apparatus, wherein the first passcode vault stores a plurality of first passcodes, each of the plurality of first passcodes is associated with one chosen from the group consisting of (i) a computing apparatus, (ii) a network, (iii) an application and (iv) a web site or web service, and wherein unlocking the first computing apparatus and the first passcode vault provides for automatically (i) retrieving a corresponding one of the plurality of first passcodes from the first passcode vault when the user requests access to, via the first computing apparatus, an application, a network, a website or a web service, and (ii) inputting the corresponding passcode at the application, the network, the website or the webservice to grant the user access to the application, the network, the website or the webservice absent user input; and
in response to a first short-range wireless communication mechanism embodied in the first computing apparatus engaging in short-range wireless communication with a second wireless communication mechanism embodied in a second computing apparatus, automatically (i) retrieving, from the first passcode vault, a passcode from amongst the plurality of first passcodes that is associated with the second computing apparatus, (ii) communicating the passcode associated with the second computing apparatus to the second computing apparatus, and (iii) inputting, at the second computing apparatus, the passcode associated with the second computing apparatus to unlock the second computing apparatus absent user input.

10. The computer-implemented method of claim 9, further comprising:
in response to the first short-range wireless communication mechanism engaging in short-range wireless communication with the second wireless communication mechanism, automatically:
retrieving a corresponding one of the plurality of first passcodes from the first passcode vault when the user requests access to, via the second computing apparatus, an application, a network, a website or a web service;
communicating the corresponding first passcode associated with the application, the network, the website or the web service to the second computing apparatus; and
inputting the corresponding first passcode at the application, the network, the website or the webservice to grant the user access, on the second computing apparatus, to the application, the network, the website or the web service absent user input.

11. The computer-implemented method of claim 9, further comprising:
mapping each character or segment of the apparatus logon passcode to a corresponding one of a plurality of first user characteristics that have been previously captured or identified;
in response to verifying that the user input matches the predefined apparatus login passcode,
capturing or identifying, at the first computing apparatus, current user characteristics;
verifying that the current user characteristics match the first user characteristics; and
in further response to verifying that the current user characteristics match the first user characteristics, unlocking the first computing apparatus and the first passcode vault.

12. The computer-implemented method of claim 11, further comprising:
in response to unlocking the first computing apparatus and the first passcode vault, continuously capturing or identifying current user characteristics;
verifying that the continuously captured or identified current user characteristics match the first user characteristics; and in response to verifying that the continuously captured or identified current user characteristics match the first user characteristic, maintaining the first passcode vault as unlocked.

13. The computer-implemented method of claim 11, further comprising:
in response to the first short-range wireless communication mechanism engaging in short-range wireless communication with the second wireless communication mechanism, capturing or identifying, at the first computing apparatus, current user characteristics;
verifying that the current user characteristics match the first user characteristics; and
in response to verifying that the current user characteristics match the first user characteristics and inputting the passcode associated with the second computing apparatus, unlocking the second computing apparatus absent user input.

14. The computer-implemented method of claim 9, further comprising:
in response to the first short-range wireless communication mechanism engaging in short-range wireless communication with the second wireless communication mechanism, synchronizing the first passcode vault with a second passcode vault stored on or accessible to the second computing apparatus, wherein the second passcode vault stores a plurality of second passcodes, each of the plurality of second passcodes is associated with one chosen from the group consisting of (i) a computing apparatus, (ii) an application and (iii) a web site or web service, wherein synchronization allows for the first and second passcodes stored in the first and second passcode vaults to be retrieved and inputted at applications, networks, websites or web services on either the first or second computing apparatus.

15. A computer program product comprising:
a non-transitory computer-readable medium comprising sets of codes for causing one or more computing devices to:
receive, at a first computing apparatus, a user input from a user that defines an apparatus login passcode;
verify that the user input matches a predefined apparatus login passcode;
in response to verifying that the user input matches the predefined apparatus login passcode, unlock the first computing apparatus and a first passcode vault stored on or accessible to the first computing apparatus, wherein the first passcode vault stores a plurality of first passcodes, each of the plurality of first passcodes is associated with one chosen from the group consisting of (i) a computing apparatus, (ii) an application and (iii) a web site or web service, and wherein unlocking the first computing apparatus and the first passcode vault provides for automatically (i) retrieving a corresponding one of the plurality of first passcodes from the first passcode vault when the user requests access to, via the first computing apparatus, an application, a network, a website or a web service, and (ii) inputting the corresponding passcode at the application, the network, the website or the web service to grant the user access to the application, the network, the website or the web service absent user input; and
in response to a first short-range wireless communication mechanism embodied in the first computing apparatus engaging in short-range wireless communication with a second wireless communication mechanism embodied in a second computing apparatus, automatically (i) retrieve, from the first passcode vault, a passcode from amongst the plurality of first passcodes that is associated with the second computing apparatus, (ii) communicate the passcode associated with the second computing apparatus to the second computing apparatus, and (iii) input, at the second computing apparatus, the passcode associated with the second computing apparatus to unlock the second computing apparatus absent user input.

16. The computer program product of claim 15, wherein the sets of codes further cause the one or more computing devices to
in response to the first short-range wireless communication mechanism engaging in short-range wireless communication with the second wireless communication mechanism, automatically:
retrieve a corresponding one of the plurality of first passcodes from the first passcode vault when the user requests access to, via the second computing apparatus, an application, a network, a website or a web service;
communicate the corresponding first passcode associated with the application, the network, the website or the web service to the second computing apparatus; and
input the corresponding first passcode at the application, the network, the website or the web service to grant the user access, on the second computing apparatus, to the application, the network, the website or the web service absent user input.

17. The computer program product of claim 15, wherein the sets of codes further cause the one or more computing devices to:
map each character or segment of the apparatus logon passcode to a corresponding one of a plurality of first user characteristics that have been previously captured or identified;
in response to verifying that the user input matches the predefined apparatus login passcode,
capture or identify, at the first computing apparatus, current user characteristics;
verify that the current user characteristics match the first user characteristics; and
in further response to verifying that the current user characteristics match the first user characteristics, unlock the first computing apparatus and the first passcode vault.

18. The computer program product of claim 17, wherein the sets of codes further cause the one or more computing devices to:
in response to unlocking the first computing apparatus and the first passcode vault, continuously capture or identify current user characteristics;
verify that the continuously captured or identified current user characteristics match the first user characteristics; and
in response to verifying that the continuously captured or identified current user characteristics match the first user characteristic, maintain the first passcode vault as unlocked.

19. The computer program product of claim 17, wherein the sets of codes further cause the one or more computing devices to:
in response to the first short-range wireless communication mechanism engaging in short-range wireless communication with the second wireless communication mechanism, capture or identify, at the first computing apparatus, current user characteristics;

verify that the current user characteristics match the first user characteristics; and in response to verifying that the current user characteristics match the first user characteristics and inputting the passcode associated with the second computing apparatus, unlock the second computing apparatus absent user input.

* * * * *